US012561216B2

(12) United States Patent　　(10) Patent No.:　US 12,561,216 B2
Ikeda et al.　　(45) Date of Patent:　　Feb. 24, 2026

(54) SAFETY DEVICE AND SAFETY METHOD

(71) Applicant: Hitachi, Ltd., Tokyo (JP)

(72) Inventors: Naohiro Ikeda, Tokyo (JP); Kotaro Shimamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/561,776

(22) PCT Filed: Apr. 21, 2022

(86) PCT No.: PCT/JP2022/018458
§ 371 (c)(1),
(2) Date: Nov. 17, 2023

(87) PCT Pub. No.: WO2022/249818
PCT Pub. Date: Dec. 1, 2022

(65) Prior Publication Data
US 2024/0241804 A1　Jul. 18, 2024

(30) Foreign Application Priority Data
May 27, 2021　(JP) ................................. 2021-088940

(51) Int. Cl.
G06F 11/16　(2006.01)
(52) U.S. Cl.
CPC ...... G06F 11/1679 (2013.01); G06F 11/1641 (2013.01)
(58) Field of Classification Search
CPC .......................... G06F 11/1679; G06F 11/1641
See application file for complete search history.

(56) References Cited

U.S. PATENT DOCUMENTS 5,239,641 A　8/1993　Horst
5,404,363 A * 4/1995　Krause ...................... G06F 1/12
714/814
(Continued)

FOREIGN PATENT DOCUMENTS

DE　20 2005 016 150 U1　2/2006
EP　0632379 A2 * 1/1995　.......... G06F 11/2089
(Continued)

OTHER PUBLICATIONS

Translated Written Opinion of the Isa PCT/JP2022/018458 dated Jul. 12, 2022 (Year: 2022).*
(Continued)

*Primary Examiner* — Ashish Thomas
*Assistant Examiner* — Indranil Chowdhury
(74) *Attorney, Agent, or Firm* — MATTINGLY & MALUR, PC

(57)　　　ABSTRACT

The safety device includes a plurality of arithmetic units which output an arithmetic result of input data as arithmetic data in each control period, a first comparison unit which compares information indicating the control period at a timing at which each of the plurality of arithmetic units outputs the arithmetic data, a plurality of temporary storage units which hold the arithmetic data output by the plurality of arithmetic units, a second comparison unit configured to compare the arithmetic data held by the plurality of temporary storage units, and an output unit configured to output the arithmetic data to outside. Each of the plurality of temporary storage units outputs the arithmetic data held therein according to a comparison result from the first comparison unit, and the output unit outputs the arithmetic data output by the temporary storage units to the outside according to a comparison result from the second comparison unit.

5 Claims, 6 Drawing Sheets

(56) References Cited

U.S. PATENT DOCUMENTS

| | | | | |
|---|---|---|---|---|
| 5,805,797 A * | 9/1998 | Sato | G06F 11/165 | |
| | | | 714/E11.017 | |
| 5,852,728 A * | 12/1998 | Matsuda | G06F 11/1604 | |
| | | | 714/2 | |
| 8,359,529 B2 * | 1/2013 | Maniwa | G06F 11/1633 | |
| | | | 714/819 | |
| 11,720,436 B1 * | 8/2023 | Park | G06F 11/0724 | |
| | | | 714/37 | |
| 12,242,849 B1 * | 3/2025 | Park | G06F 9/30047 | |
| 12,259,745 B2 * | 3/2025 | Kamiyama | H03L 7/0991 | |
| 2005/0080492 A1 * | 4/2005 | Shimamura | G05B 9/03 | |
| | | | 700/30 | |
| 2005/0240811 A1 * | 10/2005 | Safford | G06F 11/1679 | |
| | | | 714/11 | |
| 2008/0126833 A1 * | 5/2008 | Callaway | G06F 11/2038 | |
| | | | 714/E11.073 | |
| 2008/0126853 A1 * | 5/2008 | Callaway | G06F 11/1695 | |
| | | | 714/13 | |
| 2008/0215759 A1 * | 9/2008 | Maniwa | G06F 11/1633 | |
| | | | 709/248 | |
| 2009/0182991 A1 * | 7/2009 | Quach | G06F 9/30189 | |
| | | | 712/222 | |
| 2009/0183035 A1 * | 7/2009 | Butler | G06F 11/1641 | |
| | | | 714/48 | |
| 2010/0017647 A1 * | 1/2010 | Callaway | G06F 11/1641 | |
| | | | 714/48 | |
| 2013/0145207 A1 * | 6/2013 | Resnick | G06F 11/2053 | |
| | | | 714/6.2 | |
| 2015/0171837 A1 * | 6/2015 | Takahashi | F02D 41/2403 | |
| | | | 327/172 | |
| 2016/0004581 A1 * | 1/2016 | Linn | G06F 11/0724 | |
| | | | 714/37 | |
| 2020/0034262 A1 * | 1/2020 | Bemanian | G06F 11/2242 | |
| 2021/0019240 A1 * | 1/2021 | Geng | G06F 11/0793 | |

FOREIGN PATENT DOCUMENTS

| | | | |
|---|---|---|---|
| EP | 2626787 A1 | | 8/2013 |
| EP | 2709015 A2 * | | 3/2014 |
| EP | 3 587 214 A1 | | 1/2020 |
| GB | 2317032 A * | | 3/1998 |
| JP | 01-258057 A | | 10/1989 |
| JP | 2011076262 A * | | 4/2011 |
| JP | 2013161354 A | | 8/2013 |
| JP | 2014106831 A * | | 6/2014 |
| JP | 2020184184 A | | 11/2020 |
| WO | WO-2004051907 A2 * | | 6/2004 |
| WO | WO-2006045789 A1 * | | 5/2006 |

OTHER PUBLICATIONS

International Search Report of PCT/JP2022/018458 dated Jul. 12, 2022.

Written Opinion of the International Searching Authority PCT/JP2022/018458 dated Jul. 12, 2022.

Extended European Search Report received in corresponding European Application No. 22811092.0 dated Apr. 23, 2025.

* cited by examiner

FIG. 1

OUTPUT DATA

Figure 5:
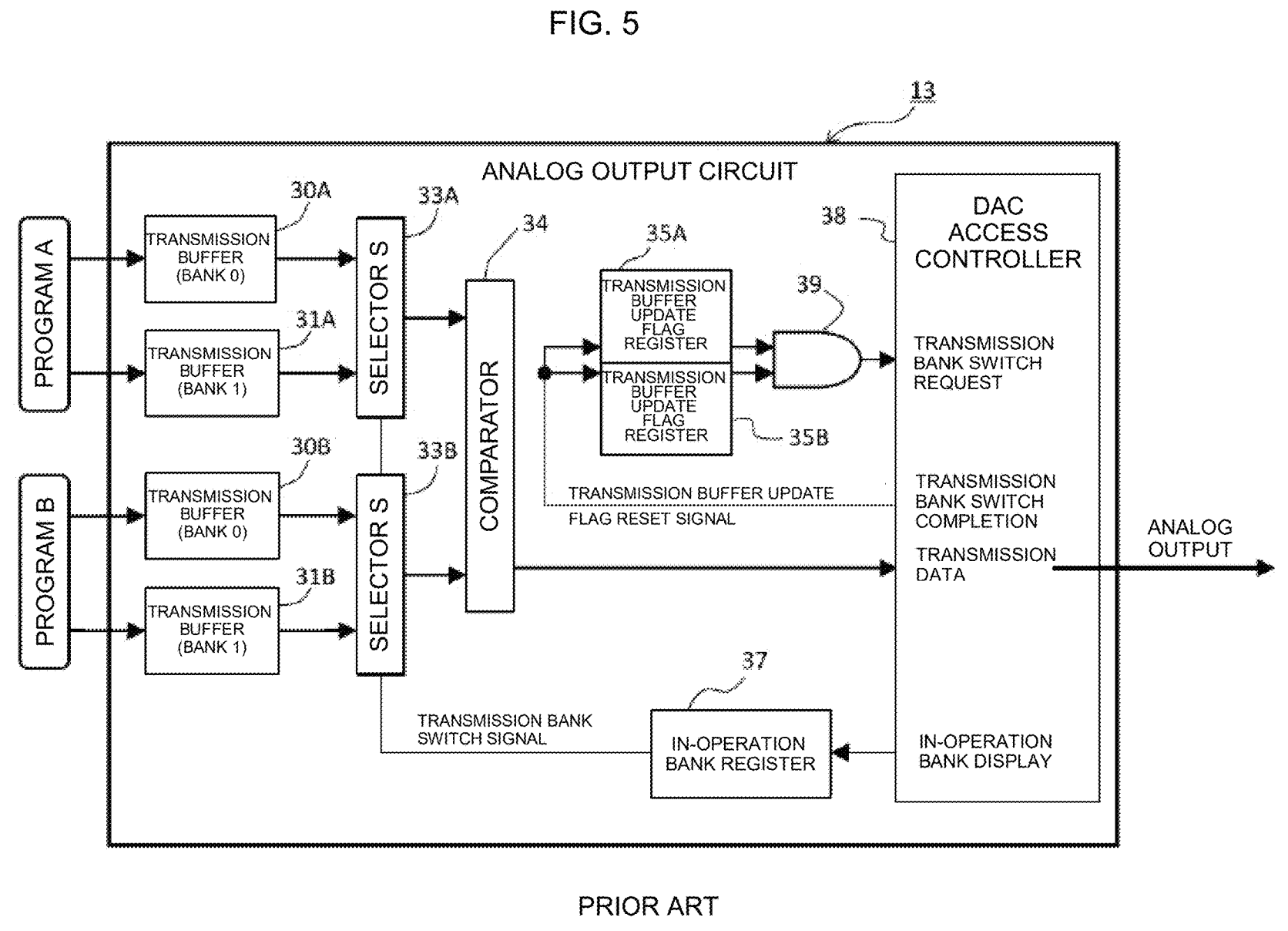

ANALOG OUTPUT CIRCUIT

DAC ACCESS CONTROLLER

TRANSMISSION BANK SWITCH REQUEST

TRANSMISSION BANK SWITCH COMPLETION

TRANSMISSION DATA

IN-OPERATION BANK DISPLAY

ANALOG OUTPUT

13

38

39

35B

35A

TRANSMISSION BUFFER UPDATE FLAG REGISTER

TRANSMISSION BUFFER UPDATE FLAG REGISTER

TRANSMISSION BUFFER UPDATE FLAG RESET SIGNAL

34

COMPARATOR

37

IN-OPERATION BANK REGISTER

TRANSMISSION BANK SWITCH SIGNAL

33A

SELECTOR S

33B

SELECTOR S

30A

TRANSMISSION BUFFER (BANK 0)

31A

TRANSMISSION BUFFER (BANK 1)

30B

TRANSMISSION BUFFER (BANK 0)

31B

TRANSMISSION BUFFER (BANK 1)

PROGRAM A

PROGRAM B

PRIOR ART

FIG. 6

PRIOR ART

SAFETY DEVICE AND SAFETY METHOD

TECHNICAL FIELD

The present invention relates to a safety device and a safety method and is mainly applied to a safety device for railway control (electronic interlocking device, and Automatic Train Control (ATC) device).

BACKGROUND ART

A railway safety device, such as an electronic interlocking device for controlling a railway signal or a railway switch, or an ATC device for safely operating a train while keeping a distance from a preceding train, is required to have high safety in order to avoid derailment and collision of the train.

That is, when a failure occurs in hardware constituting a control device forming such devices, the failure is immediately detected, and control for keeping output of the control device on a safe side and stopping the train is adopted.

Electronic devices including microcomputers have been applied to railway safety devices for a long time, and in order to achieve such high safety, a configuration is exclusively adopted in which microcomputers or memories to be mounted are multiplexed, control arithmetic results of respective systems are compared, and data is output to outside of the control device when the control arithmetic results match each other.

Examples of devices related to safety control in the related art will be illustrated below.

FIG. 5 is a diagram illustrating an analog output circuit in an I/O control device described in PTL 1.

A program A and a program B are executed by two arithmetic units (not illustrated), respectively. Data processed by the two programs is compared by a comparator 34, and when values of two pieces of data match each other, the two pieces of data are output to a DAC access controller 38. At this time, when the program A updates transmission data for a transmission bank (formed by a transmission buffer), a value "1" is registered in a transmission buffer update flag register 35A by the program A. Similarly, when the program B updates transmission data for a transmission bank, a value "1" is also registered in a transmission buffer update flag register 35B by the program B. When both the values in the transmission buffer update flag registers 35A and 35B are the value "1", the DAC access controller 38 switches transmission banks (30A to 31B) in which transmission data to be compared by the comparator 34 is stored based on a transmission bank switching request from an AND circuit 39.

As another example, FIG. 6 is a diagram illustrating a data collation device described in PTL 2.

The data collation device illustrated in FIG. 6 is a device that compares and outputs, by a synchronization adjustment collating circuit 30, data processing results from a plurality of arithmetic units. A synchronization signal generation circuit 10 causes a synchronization trigger detection unit 11 and a synchronization signal generation unit 12 to generate a synchronization signal 3 based on a specific bit string from a data source (A, B). A synchronization deviation detection circuit 20 that receives the synchronization signal 3 detects a synchronization deviation and outputs a synchronization adjustment signal 5. A multiplexer 32 of the synchronization adjustment collating circuit 30 selects data stored in a comparison shift register 31 based on the synchronization adjustment signal 5 received from the synchronization deviation detection circuit 20, and output data is compared.

CITATION LIST

Patent Literature

PTL 1: JP2020-184184A
PTL 2: JP2013-161354A

SUMMARY OF INVENTION

Technical Problem

In the example described in PTL 1, by mounting two transmission buffers for writing and reading on each of the two systems and by setting "1" in the transmission buffer update flag registers, the two systems are synchronized. However, in a situation in which operation timings of microcomputers of both systems that operate in an asynchronous manner significantly deviate, even when "1" is written in the transmission buffer update flag registers of both systems, data having different control periods may be compared, and in this case, there is a mismatch in output data of both systems, and it is difficult to prevent a malfunction.

On the other hand, in the example described in PTL 2, the synchronization signal generation circuit, the synchronization deviation detection circuit, and the synchronization adjustment collating circuit are mounted. In the design of these functional modules, it is necessary to study a state transition in consideration of an operation frequency or a timing of a CPU or a bus in each system, which is assumed to be delicate and complicated. Further, in order to improve performance of the arithmetic units or the bus, it is necessary to perform a design work again, and additional development costs are generated.

An object of the invention is to provide a safety device in which a plurality of arithmetic units that operate in an asynchronous manner can execute processing without being aware of synchronization with other systems, and comparison processing can be executed on output data of both systems without malfunction.

Solution to Problem

In order to solve the above problems, a typical safety device according to the invention includes: a plurality of arithmetic units each configured to output an arithmetic result of input data as arithmetic data in each control period; a first comparison unit configured to compare information indicating the control period at a timing at which each of the plurality of arithmetic units outputs the arithmetic data; a plurality of temporary storage units configured to hold the arithmetic data output by the plurality of arithmetic units; a second comparison unit configured to compare the arithmetic data held by the plurality of temporary storage units; and an output unit configured to output the arithmetic data to outside. Each of the plurality of temporary storage units outputs the arithmetic data held therein according to a comparison result from the first comparison unit, and the output unit outputs the arithmetic data output by the temporary storage units to the outside according to a comparison result from the second comparison unit.

Advantageous Effects of Invention

According to the invention, the plurality of arithmetic units that operate in an asynchronous manner can execute processing without being aware of synchronization with other systems. Further, when the comparison processing is executed on the output data of both systems, since reading of the output data of both systems is synchronized, the comparison processing can be executed without malfunction. In addition, since the plurality of arithmetic units perform arithmetic operations without being aware of the synchronization, it is not necessary to consider mutual operation timings of the arithmetic units, and design is easy.

Further, timing information can be configured with a limited data length since the timing information circulates in a period sufficiently longer than that of timing information on a control device, and is a unique value when viewed in a neighboring cycle before and after any control period. Therefore, a malfunction caused by comparing output data of both systems in different control cycles does not occur.

Further, even when the performance of the arithmetic unit is improved, a design change amount is small, and additional development costs can be lowered and reduced.

Problems, configurations, and effects other than those described above will be clarified by description of the following embodiment of the invention.

BRIEF DESCRIPTION OF DRAWINGS

FIG. 1 is a diagram illustrating an example of a configuration of a safety device according to the invention.

FIG. 3 is a diagram illustrating a time chart of an operation mode during abnormality (comparison mismatch).

FIG. 5 is a diagram illustrating an analog output circuit in an I/O control device described in PTL 1.

Figure 6:
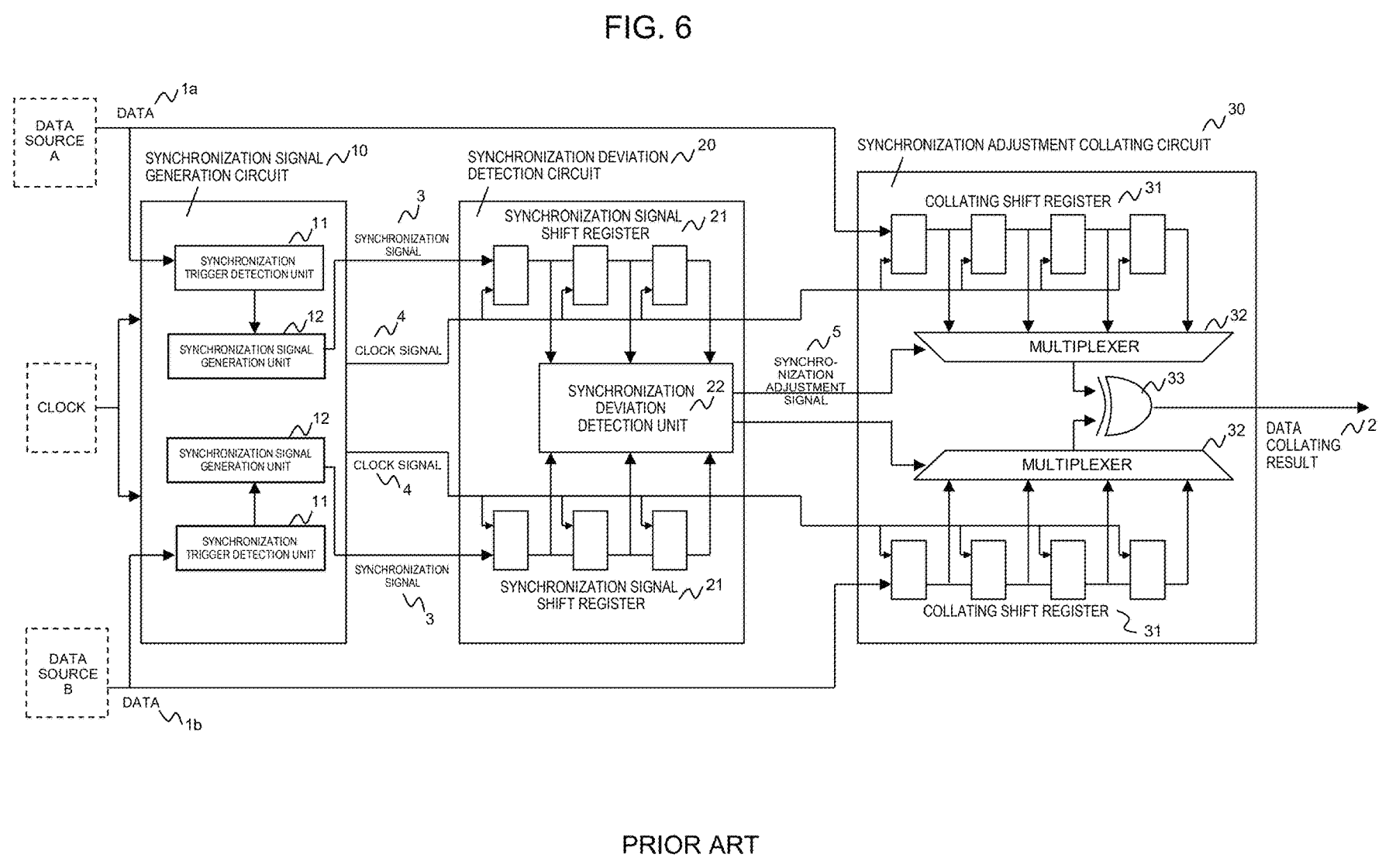

FIG. 6 is a diagram illustrating a data collation device described in PTL 2.

DESCRIPTION OF EMBODIMENTS

Figure 2:
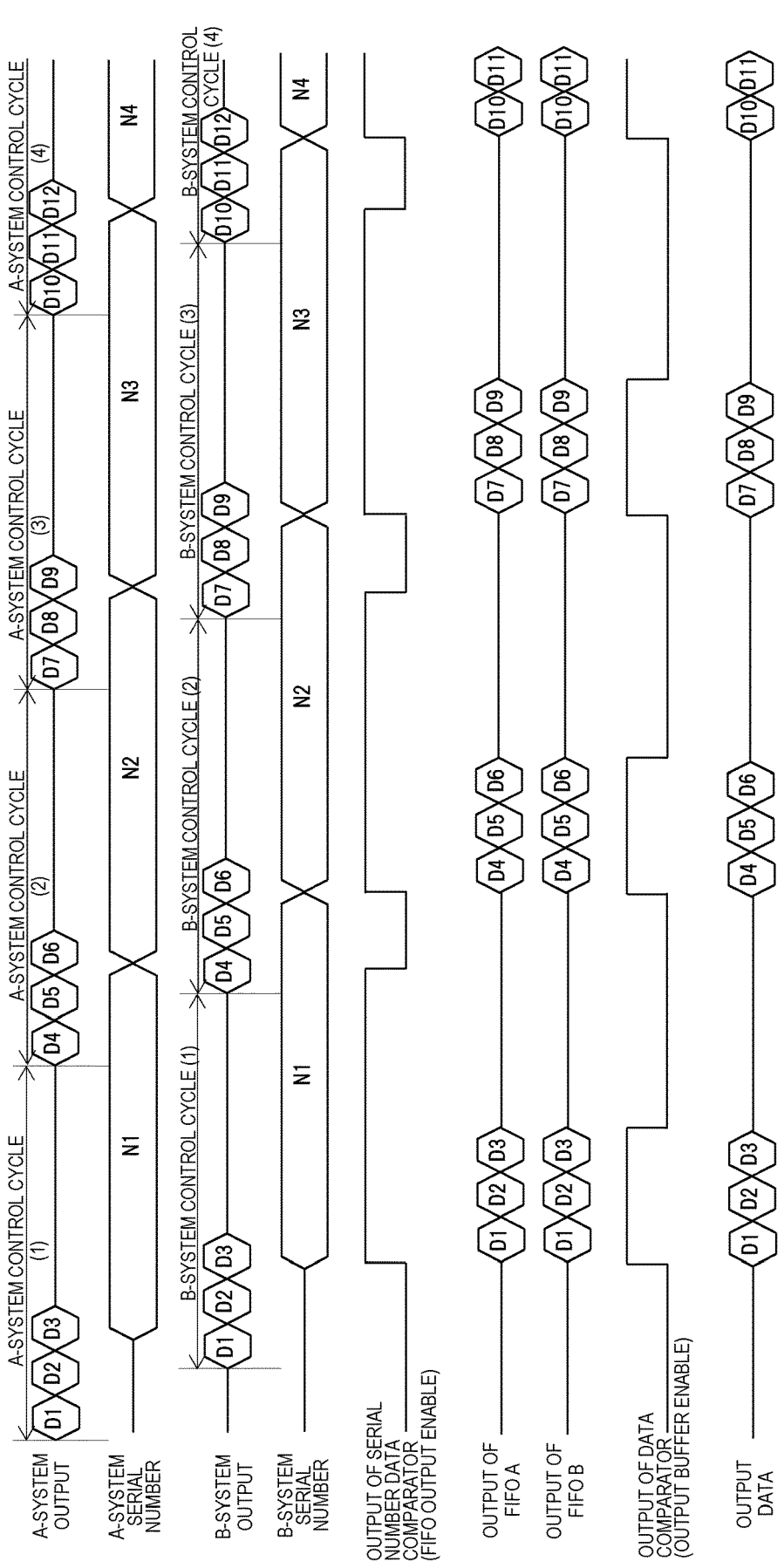
FIG. 2 is a diagram illustrating a time chart of an operation mode during normality.

Hereinafter, an embodiment according to the invention will be described with reference to the drawings. The invention is not limited to this embodiment. In the drawings, the same components are denoted by the same reference numerals.

Embodiment

Figure 1:
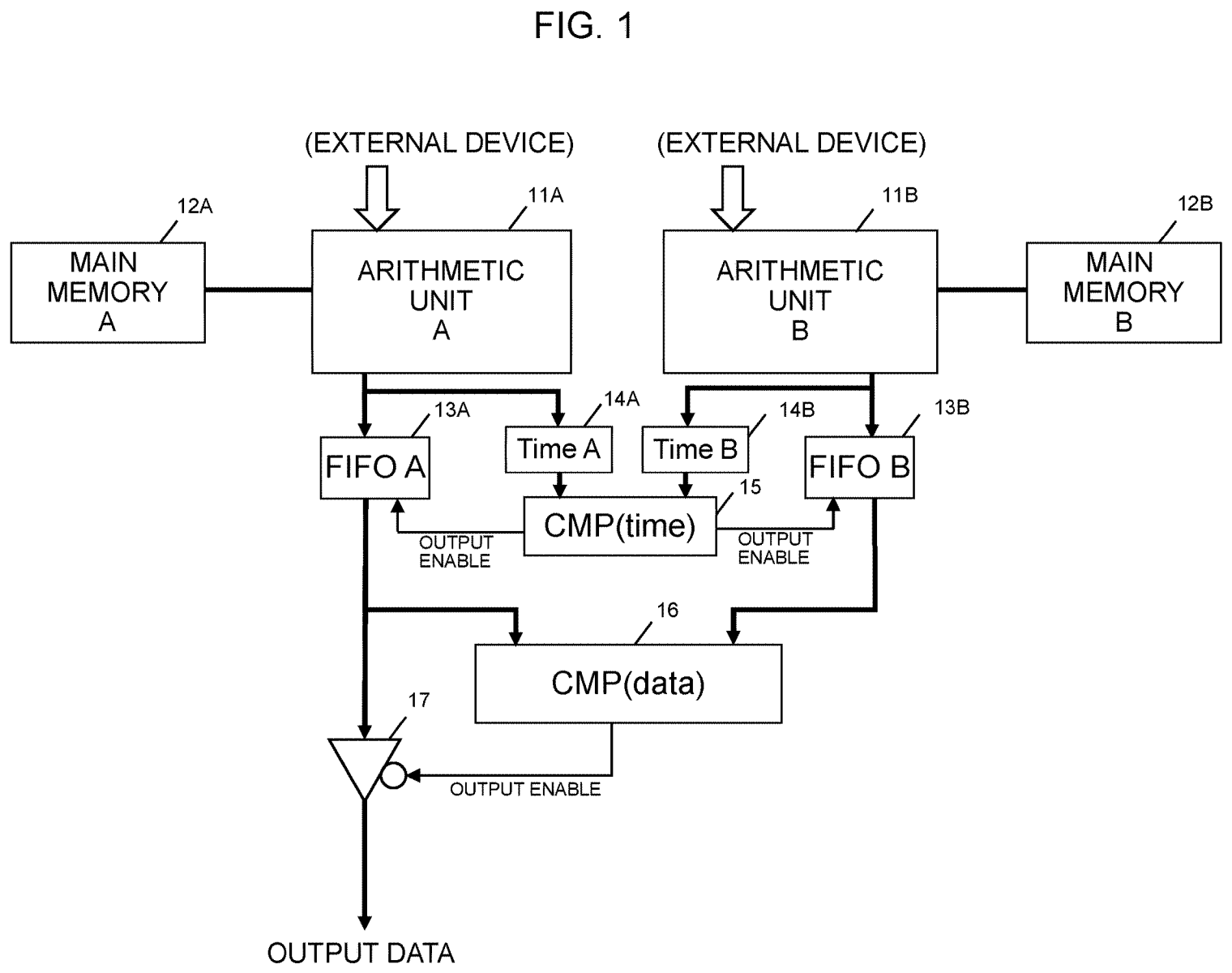

FIG. 1 is a diagram illustrating an example of a configuration of a safety device according to the invention. Here, symbols of "A" and "B" attached to components in the drawing indicate elements forming an A system and a B system, respectively. However, in the following description, when it is necessary to distinguish the A system from the B system, each system is marked as A or B, but other systems are omitted. In processing modes other than comparison processing executed by a comparator and processing of outputting data to outside, the A system and the B system operate together.

Reference numeral 11 denotes an arithmetic unit, reference numeral 12 denotes a main memory that stores a program to be executed by the arithmetic unit 11 or data, reference numeral 13 denotes a first-in-first-out type FIFO buffer that temporarily stores data to be output in each control period of the safety device, reference numeral 14 denotes a serial number data register that sets serial number data to be updated by the arithmetic unit 11 in each control period, reference numeral 15 denotes a comparator that compares values of two serial number data registers 14, reference numeral 16 denotes a comparator that compares output data of two FIFO buffers 13, and reference numeral 17 denotes an output buffer that controls whether it is possible to output data to outside of the safety device. Among them, components denoted by 11 to 14 each include an A system and a B system.

The arithmetic unit 11 basically executes the same program while accessing the main memory 12, but the two operations are not synchronized with each other and are not aware of each other. A railway safety device has a control period for performing general constant period control, and performs predetermined at constant time processing intervals.

Here, the arithmetic unit 11 receives input data from an external device (not illustrated), and further executes arithmetic processing in each control period based on various internal variables left in the main memory 12 along with a control arithmetic history up to that point. As a result, a plurality of pieces of output data derived from the outside are sequentially written to the FIFO buffer 13.

After the last piece of output data is written to the FIFO buffer 13, the serial number data indicating the control period is written to the serial number data register 14. For example, when the serial number data register 14 is a 16-bit register, the serial number data register 14 has a resolution of $2^{16}=65,536$, and the serial number data circulates in a period 65,536 times the control period.

As described above, the A-system arithmetic unit 11 and the B-system arithmetic unit 11 operate in an asynchronous manner with each other. Accordingly, at a timing when the serial number data is written to the serial number data register 14 from the arithmetic unit 11 of one system that operates with a delay, there is a match by comparison performed by the comparator 15, and output indicating the match acts as output enable of the FIFO buffer 13.

The FIFO buffer 13 includes, in addition to a memory element, a buffer for designating an address of an access destination during writing or reading or a range of the address, and a buffer incorporating a controller capable of controlling continuous access. When the output enable described above is valid, the FIFO buffer 13 sequentially outputs the written data while sequentially incrementing addresses of the plurality of pieces of stored output data.

At this time, since output data from the FIFO buffers 13 of both systems has the same timing at which reading is started, the output data is synchronized as a result. Subsequently, the output data of both systems is input to the comparator 16.

Here, when there is no failure in the arithmetic unit 11, the main memory 12, and the FIFO buffer 13, since the output data of both systems should match each other, the comparator 16 determines a comparison match and outputs an enable signal to the output buffer 17.

The output buffer 17 outputs data to the outside when the enable signal from the comparator 16 is valid. FIG. 1 illustrates an example in which the output buffer 17 receives buffer output of an A-system FIFO 13A and outputs the buffer output to the outside, and the output buffer 17 may receive buffer output of a B-system FIFO 13B and output the buffer output to the outside. Since it is secured that the data output to the outside matches between the A system and the B system, the data output to the outside is highly safe data without errors.

With respect to the above operation mode, FIG. 2 is a diagram illustrating a time chart of an operation mode during normality. Here, a situation in which the B system operates with a delay compared to the A system is illustrated.

A CPU (not illustrated) in each of both systems has a control cycle, and for example, in a control cycle (1), data D1, D2, and D3 are output as an arithmetic result. Serial number data N1 is output at a timing at which the last piece of data D3 is output.

Here, when serial number data N1 in the B system that operates with a delay is output, output of the A-system serial number data register 14 matches that of the B-system serial number data register 14, and output of the serial number data comparator 15 outputs a comparison match (an "H" level in the drawing).

At this timing, the output of the FIFO 13 in each of both systems is enabled, and the data D1, D2, and D3 written in both systems are output in synchronization.

Accordingly, the data comparator 16 outputs a comparison match (an "H" level in the drawing) as the output, and the data D1, D2, and D3 are output from the output buffer 17.

Thereafter, control cycles (2), (3), and the like continue, and the same operations as described above are repeated.

Next, a case during abnormality will be described in which a failure occurs in one of the two systems and the output data indicates a comparison mismatch.

Figure 3:
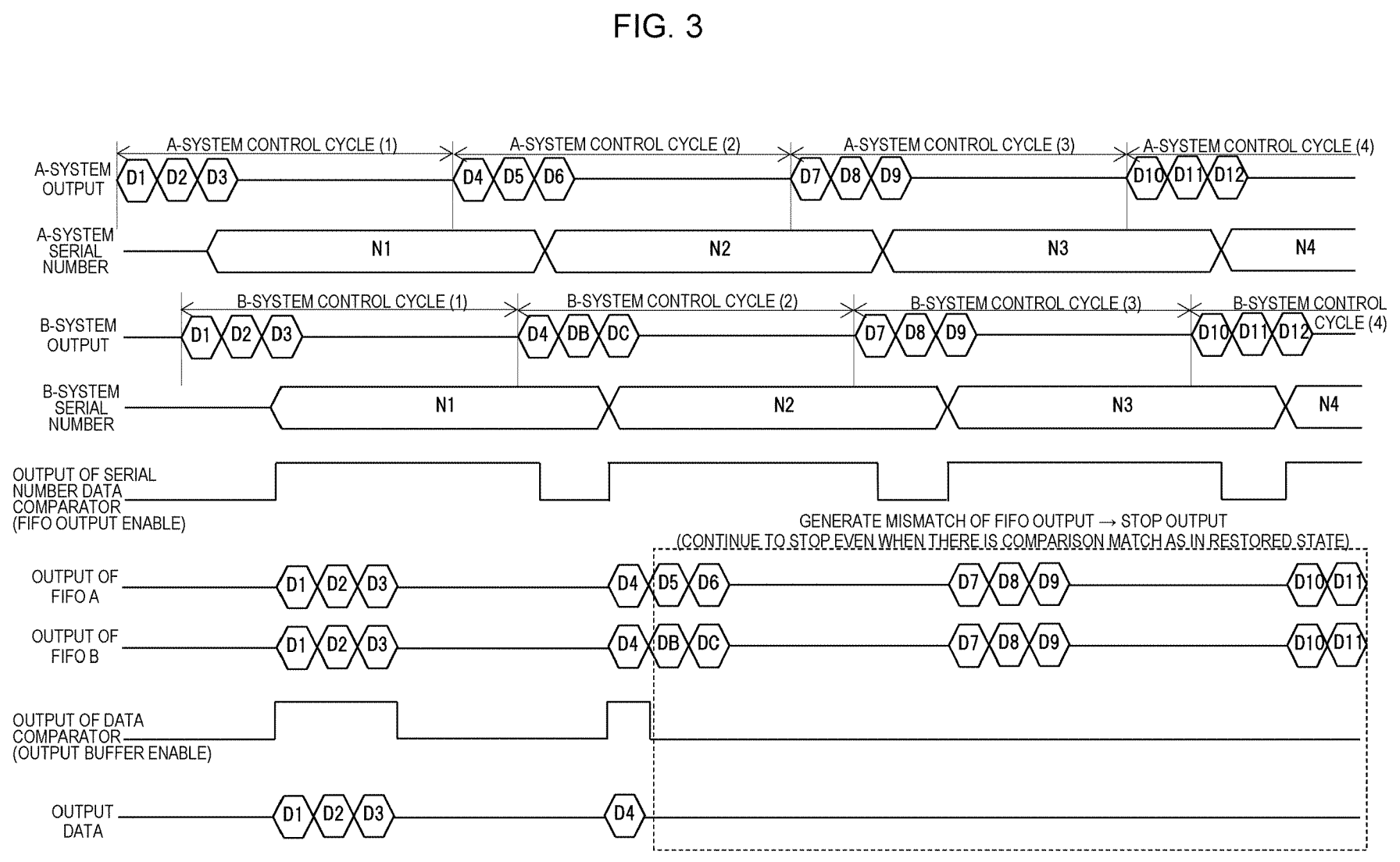

FIG. 3 is a diagram illustrating a time chart of an operation mode during abnormality (comparison mismatch).

In FIG. 3, in the control cycle (2) of both systems, the B system outputs D4, DB, and DC as data including errors while the A system outputs D4, D5, and D6 as normal data. That is, the B system is in a state in which DB and DC erroneously become D5 and D6, respectively.

In this case, the serial number data comparator 15 indicates a comparison match of serial number data N2 and enables output of the FIFO 13 of both systems. However, since there is a mismatch between the A-system data D5 and the B-system data DB and between the A-system data D6 and the B-system data DC, respectively, there is a mismatch (an "L" level in the drawing) in the output of the data comparator 16.

Then, since enable signal of the output buffer 17 is invalid, output data to the outside stops at D4 at the end.

In the next control cycle (3), there is a match of data D7, D8, and D9 between the A system and the B system as in a restored state. When a mismatch is detected once, since it is safe not to restore the data D7, D8, and D9 until a reset is made, the output data of the comparator 16 is maintained as a mismatch (an "L" level in the drawing), and the output to the outside is stopped.

Next, a case during another abnormality will be described in which a failure occurs in one of the two systems and the output data indicates a mismatch.

Figure 4:
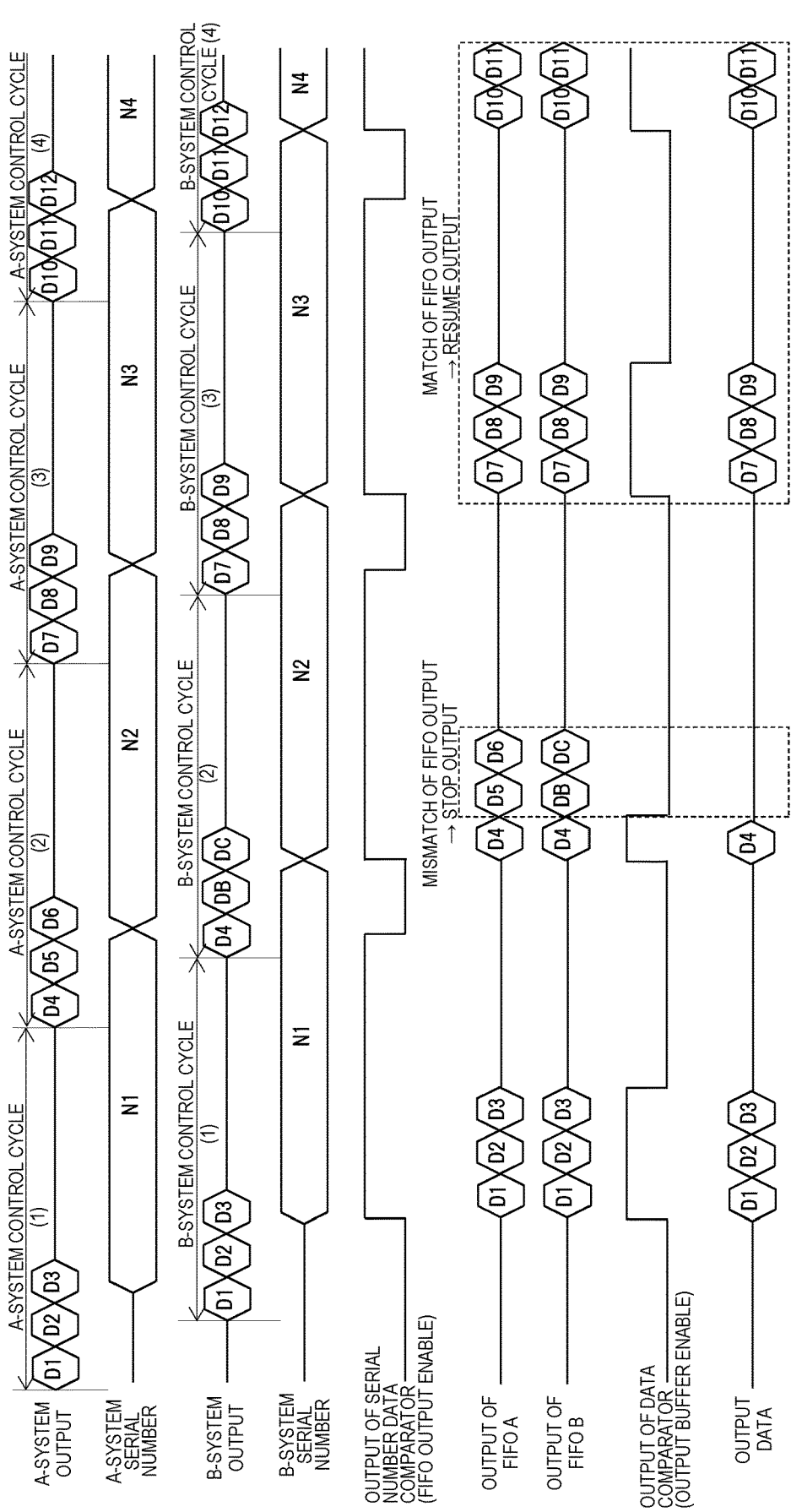
FIG. 4 is a diagram illustrating a time chart of an operation mode during another abnormality (comparison mismatch).

FIG. 4 is a diagram illustrating a time chart of an operation mode during another abnormality (comparison mismatch).

In FIG. 4, as in FIG. 3, in the control cycle (2), a state, in which a mismatch occurs in the output data of the A system and the B system and the output data in the control cycle (2) is stopped, is the same as that in the case of FIG. 3.

However, at a time point at which there is a match of output data between the A system and the B system again in the control cycle (3), the output enable from the data comparator 16 is validated and the output data resumes.

This is because, the data mismatch in the control cycle (2) is regarded as a recoverable transient failure (soft error) in any element inside the safety device, and when a match of output data in both systems can be confirmed after the control cycle (3), the output data is determined to be safe and the data output resumes.

In recent years, since miniaturization of processing of manufacturing semiconductors has remarkably progressed, resistance to soft errors due to cosmic rays or neutron beams is reduced as a trade-off of the progress. In view of this, it is possible to improve an operation rate against a transient failure by taking such measures.

In the above description, the case in which there are two arithmetic units has been described, and when there are three or more arithmetic units, comparison can be performed on each combination of two arithmetic units, respectively, and a match of output data can be determined based on decision by majority of the comparison results.

Although the embodiment according to the invention has been described above, the invention is not limited to the above-described embodiment, and various modifications can be made without departing from the gist of the invention.

REFERENCE SIGNS LIST

11A, 11B: arithmetic units A and B
12A, 12B: main memories A and B
13A, 13B: FIFO buffers A and B
14A, 14B: serial number data registers A and B
15: serial number data comparator
16: data comparator
17: output buffer

The invention claimed is:

1. A safety device comprising:
a plurality of arithmetic units which operate in an asynchronous manner relative to each other and each configured to output an arithmetic result of input data as arithmetic data in each control period;
a first comparison unit configured to compare information indicating the control period at a timing at which each of the plurality of arithmetic units outputs the arithmetic data;
a plurality of temporary storage units configured to hold the arithmetic data output by the plurality of arithmetic units, respectively;
a second comparison unit configured to compare the arithmetic data held by the plurality of temporary storage units; and
an output unit configured to output the arithmetic data to outside, wherein
each of the plurality of temporary storage units outputs the arithmetic data held therein according to a comparison result from the first comparison unit,
the output unit outputs the arithmetic data output by the temporary storage units to the outside when a comparison result from the second comparison unit indicates a match, and stops outputting the arithmetic data to the outside when the comparison result from the second comparison unit indicates a mismatch, and
the second comparison unit maintains the mismatch even when the comparison result from the second comparison unit changes to indicate a match in control periods after a time point of the mismatch.

2. The safety device according to claim 1, further comprising:
a plurality of holding units each configured to hold information indicating the control period at the timing, wherein the first comparison unit compares the information held by the plurality of holding units.

3. The safety device according to claim 1, wherein the information compared by the first comparison unit is serial number information in which the control period increases by one.

4. The safety device according to claim 3, wherein the serial number information circulates at a constant period, and the constant period is a time period sufficiently longer than the control period.

5. A safety method comprising:

a first step of calculating input data of each of a plurality of systems, which operate in an asynchronous manner relative to each other, in each control period, temporarily storing each piece of arithmetic data as an arithmetic result, and outputting information indicating the control period at a timing of outputting the arithmetic data of each of the plurality of systems;

a second step of performing first comparison, by a first comparison unit, of comparing pieces of the information indicating the control period at the timing;

a third step of performing second comparison, by a second comparison unit, of comparing pieces of the temporarily stored arithmetic data when a result of the first comparison indicates a match;

a fourth step of outputting the temporarily stored arithmetic data to outside when a comparison result from the second comparison unit indicates a match, and stopping outputting the arithmetic data to the outside when the comparison result from the second comparison unit indicates a mismatch; and a fifth step of maintaining a mismatch state even when the comparison result of the second comparison unit indicates a match in control periods after a time point of the mismatch.

* * * * *